United States Patent
Rotter et al.

(10) Patent No.: US 9,566,746 B2
(45) Date of Patent: Feb. 14, 2017

(54) METHODS AND TOOLS FOR FORMING CONTOURED COMPOSITE STRUCTURES WITH SHAPE MEMORY ALLOY

(71) Applicant: The Boeing Company, Seal Beach, CA (US)

(72) Inventors: Daniel M. Rotter, Lake Forest Park, WA (US); Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 14/188,252

(22) Filed: Feb. 24, 2014

(65) Prior Publication Data

US 2015/0123309 A1 May 7, 2015

Related U.S. Application Data

(60) Provisional application No. 61/900,480, filed on Nov. 6, 2013.

(51) Int. Cl.
*B29C 61/00* (2006.01)
*B29C 70/44* (2006.01)
(Continued)

(52) U.S. Cl.
CPC .............. *B29C 70/44* (2013.01); *B29C 53/04* (2013.01); *B29C 70/46* (2013.01);
(Continued)

(58) Field of Classification Search
CPC ........ B29C 70/44; B29C 70/46; B29C 61/006; B29C 53/04; C22F 1/006; Y02T 50/433
(Continued)

(56) References Cited

U.S. PATENT DOCUMENTS 4,657,717 A * 4/1987 Cattanach ........... B29C 43/3642
264/102
5,530,227 A * 6/1996 Matsen ................ B21D 26/021
219/603
(Continued)

FOREIGN PATENT DOCUMENTS

EP 2 562 080 2/2013
JP 57 125020 8/1982
(Continued)

OTHER PUBLICATIONS

Will Lark, MIT proposal, 2005, http://fab.cba.mit.edu/classes/961.04/people/will/proposal.htm, accessed on May 22, 2016.*
(Continued)

*Primary Examiner* — Alison L Hindenlang
*Assistant Examiner* — Mohamed K Ahmed Ali
(74) *Attorney, Agent, or Firm* — DASCENZO Intellectual Property Law, P.C.

(57) ABSTRACT

Methods and tools for forming contoured composite structures are disclosed. Methods include positioning a sheet of composite material relative to a structure of shape memory alloy, heating the structure of shape memory alloy to deform the structure of shape memory alloy to a deformed conformation and thereby conform the sheet of composite material to a desired contour corresponding to the deformed conformation of the structure of shape memory alloy. Tools include a structure of shape memory alloy and a heat source for heating the structure of shape memory alloy to conform a sheet of composite material to a desired contour corresponding to the deformed conformation of the structure of shape memory alloy.

19 Claims, 6 Drawing Sheets

(51) Int. Cl.
*B29C 70/46* (2006.01)
*B29C 53/04* (2006.01)
*B29K 105/08* (2006.01)
*C22F 1/00* (2006.01)

(52) U.S. Cl.
CPC ...... *B29K 2105/0872* (2013.01); *C22F 1/006* (2013.01); *Y02T 50/433* (2013.01)

(58) Field of Classification Search
USPC .......................................... 264/230; 425/403
See application file for complete search history.

(56) References Cited

U.S. PATENT DOCUMENTS

| | | | |
|---|---|---|---|
| 5,700,337 | A | 12/1997 | Jacobs et al. |
| 6,773,535 | B1 | 8/2004 | Wetzel |
| 7,228,611 | B2 | 6/2007 | Anderson et al. |
| 7,527,222 | B2 | 5/2009 | Biornstad et al. |
| 8,157,212 | B2 | 4/2012 | Biornstad et al. |
| 8,168,023 | B2 | 5/2012 | Anderson et al. |
| 8,182,628 | B2 | 5/2012 | Biornstad et al. |
| 2006/0157908 | A1* | 7/2006 | Verbrugge ............. B23Q 3/086 269/224 |
| 2007/0063566 | A1* | 3/2007 | Browne ............... B60N 2/4221 297/344.11 |
| 2010/0011580 | A1 | 1/2010 | Brennan et al. |
| 2010/0012260 | A1 | 1/2010 | Brennan et al. |
| 2011/0300358 | A1 | 12/2011 | Blohowiak et al. |

FOREIGN PATENT DOCUMENTS

| | | |
|---|---|---|
| JP | 58 96521 | 6/1983 |
| JP | 61 76351 | 4/1986 |

OTHER PUBLICATIONS

U.S. Appl. No. 13/693,887, filed Dec. 4, 2012, Rotter et al.
U.S. Appl. No. 13/732,961, filed Jan. 2, 2013, Rotter et al.
U.S. Appl. No. 13/886,976, filed May 3, 2013, Metschan et al.
U.S. Appl. No. 14/018,268, filed Sep. 4, 2013, Rotter et al.
Machine generated English translation of abstract for JP 57 125020, downloaded from espacenet.com on Mar. 18, 2016.
Machine generated English translation of abstract for JP 58 96521, downloaded from espacenet.com on Mar. 18, 2016.
Machine generated English translation of abstract for JP 61 76351, downloaded from espacenet.com on Mar. 18, 2016.
European Patent Office, Extended European Search Report for related European patent application EP 14 19 1614, Feb. 8, 2016.

* cited by examiner

METHODS AND TOOLS FOR FORMING CONTOURED COMPOSITE STRUCTURES WITH SHAPE MEMORY ALLOY

RELATED APPLICATION

This application claims priority under 35 U.S.C. §119(e) to U.S. Provisional Patent Application No. 61/900,480, which is entitled "METHODS AND TOOLS FOR FORMING CONTOURED COMPOSITE STRUCTURES WITH SHAPE MEMORY ALLOY," which was filed on Nov. 6, 2013, and the disclosure of which is hereby incorporated by reference.

FIELD

The present disclosure relates to forming contoured composite structures.

BACKGROUND

Composite structures, such as those that are constructed of fiber reinforced composite materials, typically are formed by conforming pre-cured or partially cured flexible sheets of composite material to a rigid mold. Depending on the ultimate structure being formed, the mold may be required to have very precise tolerances relative to a desired ultimate shape of the structure being formed. Such molds, especially when very large, are very expensive to construct and maintain. Moreover, due to the nature of conforming a generally planar sheet of material to a mold having contours, including complex contours, it often is difficult to avoid imparting undesired wrinkles to the composite material. Such wrinkling or other anomalies created during forming may not be acceptable to meet the performance requirements of the final composite structure.

SUMMARY

Methods and tools for forming contoured composite structures with shape memory alloy, as well as apparatuses, including aerospace structures, that are constructed of contoured composite structures, are disclosed herein. Methods include positioning a sheet of composite material in operative relation to a structure of shape memory alloy, heating the structure of shape memory alloy to within its activated temperature range, thereby conforming the sheet of composite material to a desired contour, and then cooling the structure of shape memory alloy to below its activated temperature range. Tools include a structure of shape memory alloy and a heat source configured to heat the structure of shape memory alloy to within its activated temperature range to conform a sheet of composite material to a desired contour.

DESCRIPTION

Figure 1:
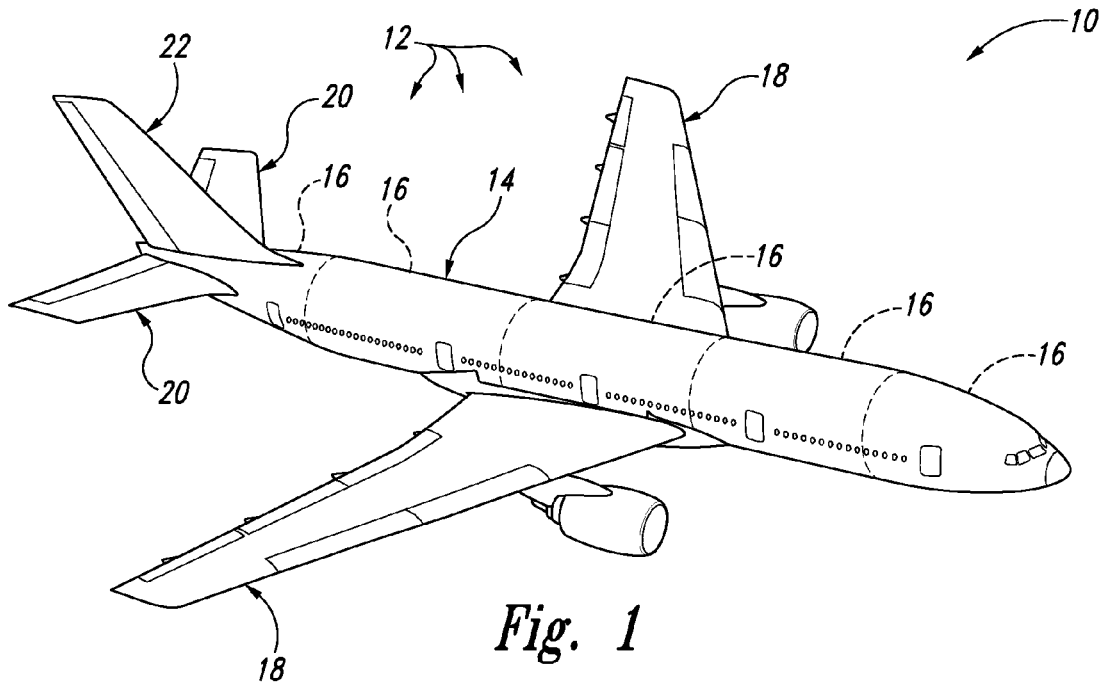
FIG. 1 is a perspective view of an illustrative, non-exclusive example of an aircraft.

Methods and tools for forming contoured composite structures, as well as apparatuses constructed of contoured composite structures, are disclosed herein. In general, in the drawings, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

In FIG. 1, an example aircraft 10, which may include various contoured composite structures 12, is provided; however, apparatuses other than aircraft are within the scope of the present disclosure and may include contoured composite structures. For example, as illustrative, non-exclusive examples, other apparatuses that may include contoured composite structures include (but are not limited to) spacecraft, watercraft, land vehicles, wind turbines, structural towers and masts, etc. Moreover, aircraft 10 may take any suitable form, including commercial aircraft, military aircraft, private aircraft, or any other suitable aircraft. While FIG. 1 illustrates aircraft 10 in the form of a fixed wing commercial aircraft, other types and configurations of aircraft are within the scope of aircraft 10 according to the present disclosure, including (but not limited to) helicopters.

As used herein, a composite structure refers to a structure that is constructed of composite materials, such as (but not limited to) fiber reinforced composite materials. Illustrative, non-exclusive examples of fiber reinforced composite materials include at least an epoxy or other polymer or binding material together with fibers, such as constructed of (but not limited to) glass fibers, carbon fibers, boron fibers, para-aramid (e.g., Kevlar®) fibers, and/or other fibers. In some examples, composite structures may be constructed of multiple layers, or plies, of fiber reinforced composite material, and may be described as a composite laminate or lamination. In some such examples, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are flexible and tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies. Prior to being cured, composite materials may be somewhat flexible, or at least flexible relative to a cured state of the composite material. Accordingly, prior to being cured, the composite material, which may be in the form of a sheet, or charge, may be molded or otherwise formed into a desired contour. Some composite materials may require heating prior to or during the forming or molding process, with such heat making the composite material more malleable and easier to conform to a desired shape, yet with such heat being lower than the temperature required to cure, and stiffen, the composite material. The temperature of the composite laminate may influence the rate of forming or the amount of bending that is permissible to define a desired contour due to the viscous properties of the uncured resin. Upon being cured, composite materials become rigid and hold their shape, yet may have a desired resilience depending on a particular application for the composite structure.

With continued reference to FIG. 1, aircraft 10 typically may be described as including a fuselage 14, which generally corresponds to the main body of an aircraft for holding passengers, crew, cargo, and/or equipment, for example, depending on the particular configuration and/or function of an aircraft. Typically, although not required, the fuselage of an aircraft is elongate and somewhat cylindrical or tubular. In some examples, a fuselage may be constructed of multiple sections 16 that are longitudinally spaced along the fuselage and operatively coupled together to define the fuselage. In FIG. 1, five fuselage sections are indicated schematically; however, any number or size and shape of sections 16 may be used to construct a fuselage.

Aircraft 10 also may include wings 18, horizontal stabilizers 20, and a vertical stabilizer 22. One or more of a fuselage, wings, horizontal stabilizers, and vertical stabilizers may be constructed of composite materials. In some examples, such structures may be described as stiffened composite structures, such as being defined by a skin supported by a structural frame, or stiffeners. Any one or more of the aforementioned various structures of an aircraft, as well as other structures of an aircraft, may be described as contoured composite structures. By contoured, it is meant that such structures define non-planar surfaces. Some examples of contoured composite structures according to the present disclosure may have non-planar surfaces with a complex contour, meaning that within a given region of the surface, the intersection with any orientation of a plane is not linear.

Figure 2:
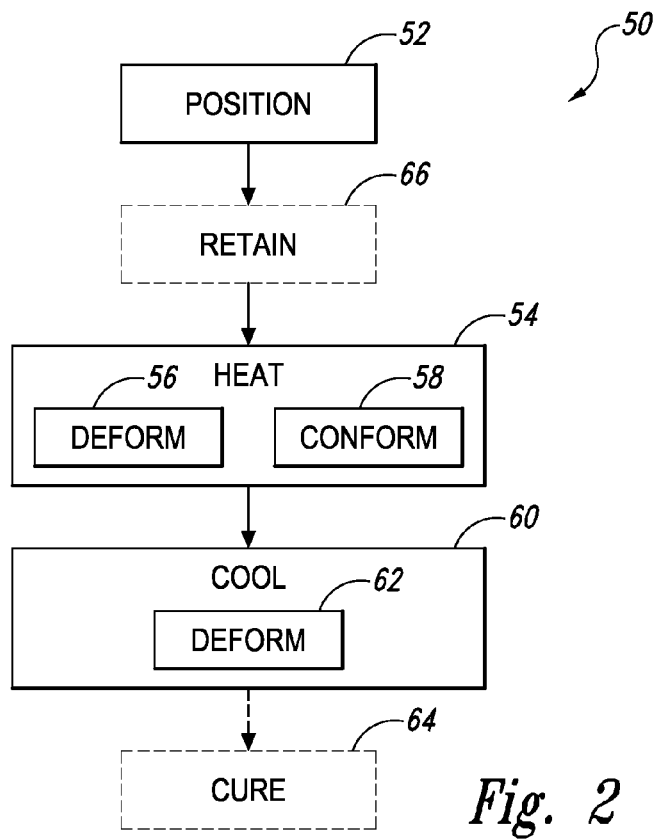
FIG. 2 is a flowchart representing illustrative, non-exclusive examples of methods of forming contoured composite structures.

FIG. 2 schematically provides a flowchart that represents illustrative, non-exclusive examples of methods 50 of forming contoured composite structures. FIGS. 3-13 schematically illustrate illustrative, non-examples of tools 100, and component parts thereof, for forming contoured composite structures, with such tools optionally being configured to perform one or more methods 50. Methods 50 and tools 100 utilize a structure of shape memory alloy. Shape memory alloys, which sometimes are referred to as smart metals, memory metals, memory alloys, and/or smart alloys, are a classification of materials that are configured to deform from a first non-deformed conformation (or shape) to a second deformed, and different, conformation (or shape) when heated within an activated temperature range. Additionally or alternatively, some shape memory alloys may include more than two conformations, such as an intermediate conformation (or shape) when heated within a temperature range that is less than the activated temperature range. Additionally or alternatively, some shape memory alloys may be described as including more than one activated temperature range, with respective temperature ranges being operative to deform the shape memory alloy into a respective conformation. Typical shape memory alloys include alloys of copper, aluminum, and nickel and alloys of nickel and titanium; however, other examples of shape memory alloys are within the scope of the present disclosure and may be utilized by methods 50 and tools 100. Some shape memory alloys may be described as existing in a martensite phase at a relative lower temperature and in an austenite phase at a relatively higher temperature. In such an alloy, the austenite phase may be described as occurring when the alloy is heated to within its activated temperature range.

Figure 3:
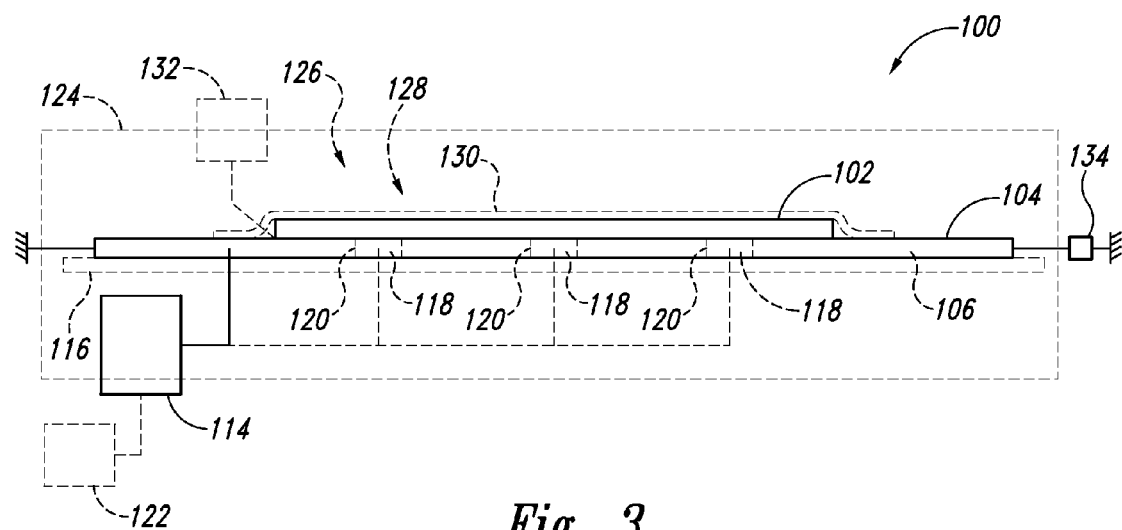
FIG. 3 is a schematic diagram representing illustrative, non-exclusive examples of tools for forming contoured composite structures, together with a sheet of composite material to be formed into a contoured composite structure.
Figure 4:
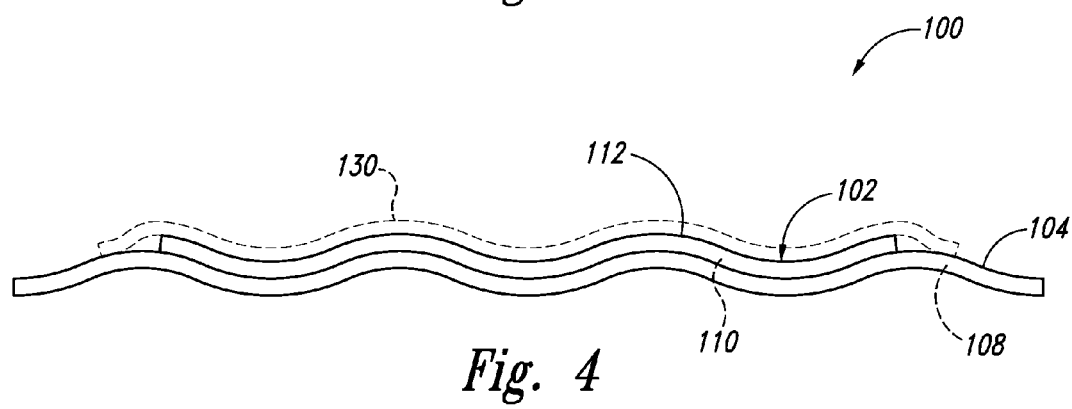
FIG. 4 is a schematic diagram representing the structure of shape memory alloy of the tool of FIG. 3 together with the sheet of composite material, with the structure of shape memory alloy having been heated from a non-deformed conformation to a deformed conformation and with the sheet of composite material conformed to the structure of shape memory alloy.
Figure 5:
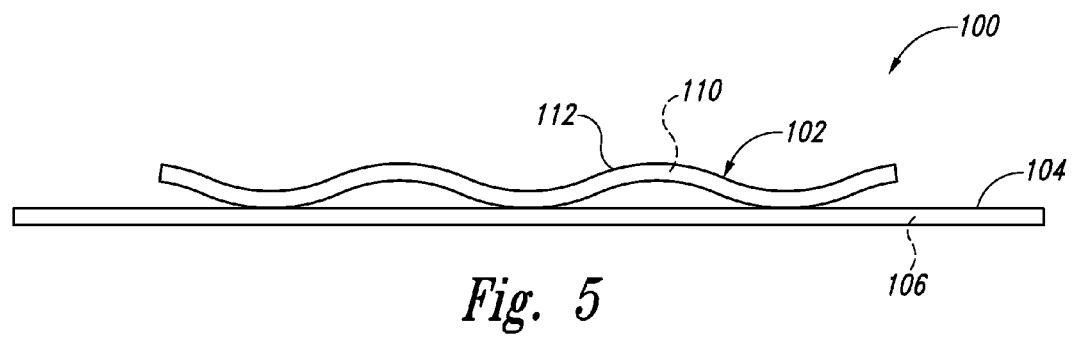
FIG. 5 is a schematic diagram representing the structure of shape memory alloy of the tool of FIG. 3 together with the sheet of composite material, with the structure of shape memory alloy having been cooled from the deformed conformation to the non-deformed conformation and with the sheet of composite material having been set into a desired contour by the structure of shape memory alloy.

With reference initially to the flowchart of FIG. 2 and the schematic representation of tools 100 of FIGS. 3-5, a method 50 may include positioning a sheet of composite material 102 in operative relation to a structure of shape memory alloy 104, as schematically indicated at 52. Then, following the positioning 52, a method 50 may include heating the structure of shape memory alloy to within its activated temperature range, as schematically indicated at 54. The heating 54 results in deforming the structure of shape memory alloy from its first, or non-deformed, conformation 106 to its second, or deformed, conformation 108, as schematically indicated at 56 in FIG. 2, and conforming the sheet of composite material 102 to a desired contour 110 that at least partially corresponds to the second conformation 108 of the structure of shape memory alloy, as schematically indicated at 58 in FIG. 2. In some examples, the second conformation of the structure of shape memory alloy may have, or define, a complex contour. The conformed configuration of the sheet of composite material having its desired contour may be described as a conformed sheet of composite material 112, and optionally in some examples, the desired contour may be a complex contour. Then, as schematically indicated 60, following the heating 54, a method 50 may include cooling the structure of shape memory alloy to below its activated temperature range, thereby deforming the structure of shape memory alloy from its second conformation back to its first conformation, as schematically indicated at 62. Despite the shape memory alloy returning to its first conformation as a result of the cooling 62, the sheet of composite material maintains its desired contour 110.

In FIGS. 3-5, the first conformation of the structure of shape memory alloy 104 and the initial configuration of the sheet of composite material 102 are illustrated as being generally planar, and the second conformation of the structure of shape memory alloy 104 and the desired contour of the sheet of composite material 102 are illustrated as having generally sinusoidal contours. However, while such configurations are within the scope of the present disclosure, such configurations are not required, and the representations of the structure of shape memory alloy and the sheet of composite material in the Figures are schematic in nature and do not limit the possible configurations and contours of the structure of shape memory alloy and the sheet of composite material, including before the deforming, during the deforming, and after the deforming of the structure of shape memory alloy and thus before the conforming, during the conforming, and after the conforming of the sheet of composite material to the second conformation of the structure of shape memory alloy. For example, as mentioned, although not required, the second conformation of the structure of shape memory alloy and the desired contour of the composite material may have, or define, complex contours.

In some methods 50, the heating 54 may at least partially set, or at least partially cure, the conformed sheet of composite material 112 in the desired contour 110. Accordingly, upon cooling 60, the conformed sheet of composite material will remain in its desired contour and not revert, or relax, back to its pre-conformed state.

The heating 54 may be performed in any suitable manner. A tool 100 therefore may include a heat source 114 that is configured to heat the structure of shape memory alloy 104 to within its activated temperature range to deform the structure of shape memory alloy from its first conformation to its second conformation and thus to conform the sheet of composite material 102 to the desired contour 110. Any suitable heat source may be incorporated into a tool 100 and utilized by a method 50. For example, as schematically and optionally illustrated in FIG. 3, a heat source may include one or more heating plates 116 that are in operative engagement with the structure of shape memory alloy 104. Additionally or alternatively, a heat source may include one or more resistive heating elements 118 that are integral with, or at least partially embedded within, the structure of shape memory alloy. In some examples of tools 100, the structure of shape memory alloy 104 may be described as including a plurality of sub-regions, and the heat source 114 may be configured to operatively heat fewer than all of the plurality of sub-regions. Stated differently, the heat source may be configured to heat a first subset of sub-regions of the structure of shape memory alloy to within the activated temperature range and to not heat a second subset of sub-regions of the structure of shape memory alloy to within the activated temperature range. This example is schematically illustrated in FIG. 3, in which a subset of sub-regions 120 are optionally illustrated in connection with the heat source by dashed lines. In some such embodiments of tools 100, the sub-regions 120 may include embedded resistive heating elements 118; however, other mechanisms for selectively heating only a subset of sub-regions of the structure of shape memory alloy also may be used.

In some methods 50, the heating 54 may include sequentially heating sub-regions of the structure of shape memory alloy 104 in a predetermined sequence. Accordingly, a heat source 114 of a tool 100, in some embodiments, may be configured to sequentially heat predetermined sub-regions of the structure of shape memory alloy in a predetermined sequence. In some such embodiments, a tool 100 additionally may include a controller 122 that is configured to operatively control the heat source for sequentially heating the sub-regions in a predetermined sequence. Such methods and tools may be useful to form contoured composite structures 12 with complex contours, or non-complex contours, without the sheet of composite material 102 wrinkling during the conforming 58. The controller 122, when present, may take any suitable form and may include one or more of a computer and software. For example, a computer may utilize non-transitory computer readable storage media including computer-executable instructions that, when executed, direct the computer to control the heat source to sequentially heat predetermined sub-regions of the structure of shape memory alloy in a predetermined sequence.

In connection with some methods 50 and some tools 100, the heat source 114 may include an autoclave or oven 124, as schematically illustrated in FIG. 3. Accordingly, a method 50 additionally may include positioning the sheet of composite material 102 and the structure of shape memory alloy 104 in the optional autoclave or oven, with the heating 54 being performed by the autoclave or oven.

In some methods 50, the heating 54 may include curing the conformed sheet of composite material 112, thereby resulting in a cured composite structure. Accordingly, in some tools 100, the heat source 114 not only may be configured to heat the structure of shape memory alloy to within its activated temperature range, but it also may be configured to heat the composite material to within its cure temperature range. As illustrative, non-exclusive examples, a typical activated temperature range of a shape memory alloy may be in the range of approximately 140 degrees Fahrenheit, whereas, a typical cure temperature range of a composite material may be in the range of approximately 350 degrees Fahrenheit; however, other examples of shape memory alloy and composite materials are within the scope of the present disclosure.

Additionally or alternatively, a method 50 further may include, following the cooling 60, curing the conformed sheet of composite material 112 to result in a cured composite structure, as schematically and optionally indicated at 64 in FIG. 2. In some such methods, the curing 64 may be performed within an autoclave or oven 124. In some methods, the structure of shape memory alloy may be located within the autoclave or oven with the conformed sheet of composite material, while in other methods, the structure of shape memory alloy first may be separated from the conformed sheet of composite material and the conformed sheet of composite material may be located within the autoclave or oven without the structure of shape memory alloy.

As schematically and optionally indicated in FIG. 2 at 66, some methods 50 further may include, following the positioning 52 and prior to the heating 54, retaining the sheet of composite material 102 relative to the structure of shape memory alloy 104. Accordingly a tool 100 optionally may include a retention structure 126 that is configured to selectively retain the sheet of composite material relative to the structure of shape memory alloy when the heat source heats the structure of shape memory alloy to within the activated temperature range, as schematically illustrated in FIG. 3. As an illustrative, non-exclusive example, the retention structure 126 may include a vacuum bagging assembly 128, and thus the retaining 66 of a method 50 may include vacuum bagging the sheet of composite material to the structure of shape memory alloy. For example, the vacuum bagging assembly may include a gas-impermeable sheet of flexible material 130 for operative placement over the sheet of composite material, with the gas-impermeable sheet of flexible material being sealed against the structure of shape memory alloy or other structure relative to the sheet of composite material and the structure of shape memory alloy. The vacuum bagging assembly also may include a vacuum source 132 that is configured to evacuate air from between the gas-impermeable sheet of flexible material and the structure of shape memory alloy, and thus from between the sheet of composite material and the structure of shape memory alloy, thereby retaining via suction the sheet of composite material to the structure of shape memory alloy. In some methods, the retaining 66 additionally may be described as compacting the sheet of composite material to the structure of shape memory alloy.

As schematically illustrated in FIG. 3, some tools 100 optionally may include a mechanical impeder 134 that is operatively coupled between the structure of shape memory alloy 104 and ground. When present, the mechanical impeder may resist, or retard, the deformation of the structure of shape memory alloy from its first conformation 106 to its second, deformed conformation 108. Such a configuration of tool 100 may facilitate the second conformation corresponding to a desired contour. For example, as an illustrative non-exclusive example, when heated to within its activated temperature range, the structure of shape memory alloy may behave similar to a spring and contract a first, longer dimension, to a second, shorter dimension. Absent a mechanical impeder, the second, shorter dimension may be smaller than desired. Accordingly, a mechanical impeder may be selected, or adjusted, to result in a desired second conformation of the structure of shape memory alloy. Additionally or alternatively, the mechanical impeder may facilitate a controlled rate of deformation of the structure of shape memory alloy from its first conformation to its second conformation. For example, depending on the characteristics of the composite material being conformed, the viscosity of the resin may prevent the laminate from appropriately conforming to the structure of shape memory alloy, unless the deforming is controlled to a suitable rate. An illustrative, non-exclusive example of a mechanical impeder that may be utilized with a tool 100 includes an air cylinder with flow control valves.

In connection with tools 100 that include an optional mechanical impeder 134, a method 50 may be described as optionally including, concurrently with the heating 54, impeding the deforming 56 of the structure of shape memory alloy 104 to control the deformation of the structure of shape memory alloy to the second conformation 108, such as to correspond to the desired contour 110 of the sheet of composite material 102.

Figure 6:
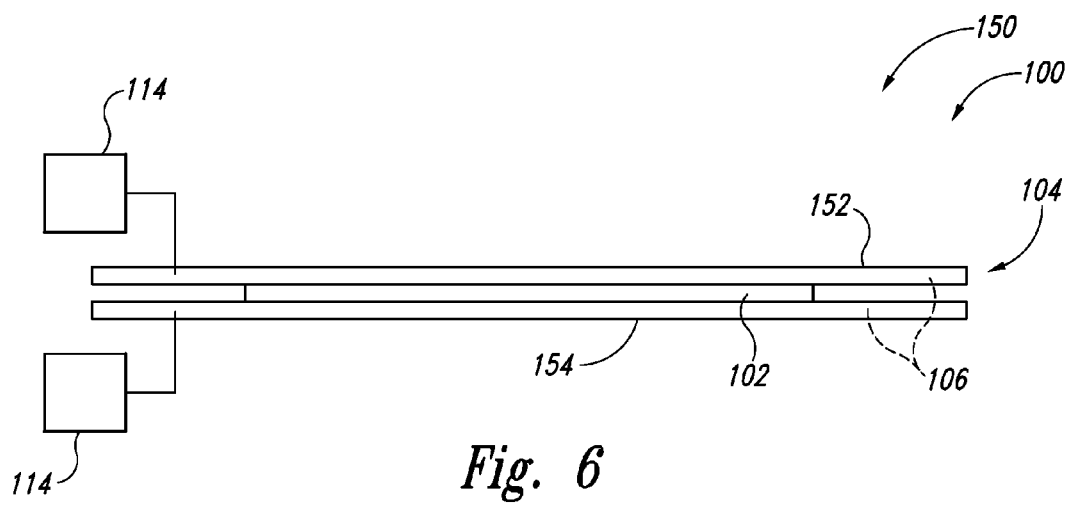
FIG. 6 is a schematic diagram representing additional illustrative, non-exclusive examples of tools for forming contoured composite structures, together with a sheet of composite material to be formed into a contoured composite structure.
Figure 7:
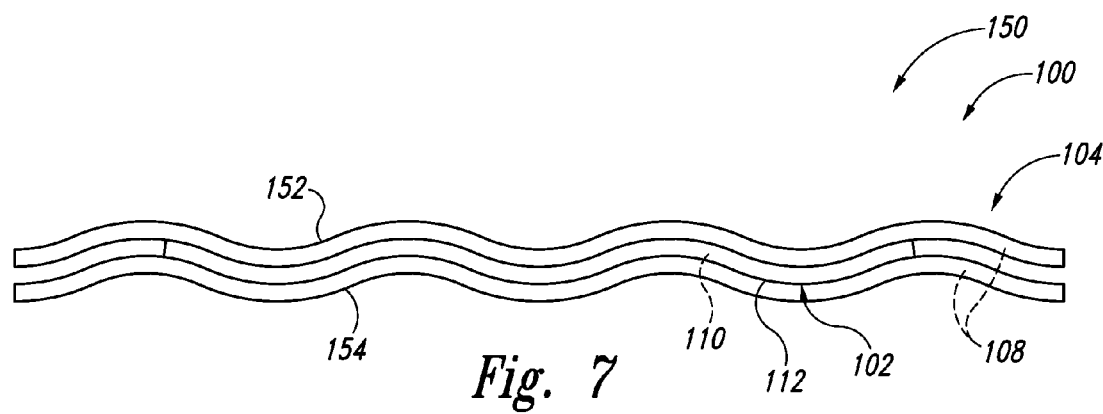
FIG. 7 is a schematic diagram representing the structure of shape memory alloy of the tool of FIG. 6 together with the sheet of composite material, with the structure of shape memory alloy having been heated from a non-deformed conformation to a deformed conformation and with the sheet of composite material conformed to the structure of shape memory alloy.
Figure 8:
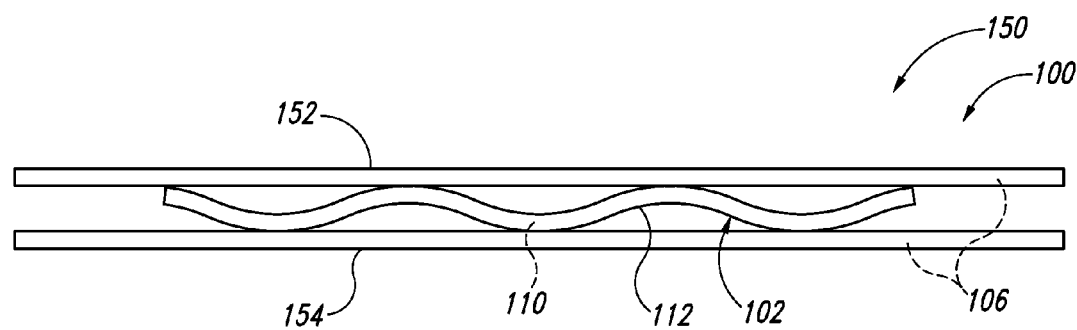
FIG. 8 is a schematic diagram representing the structure of shape memory alloy of the tool of FIG. 6 together with the sheet of composite material, with the structure of shape memory alloy having been cooled from the deformed conformation to the non-deformed conformation and with the sheet of composite material having been set into a desired contour by the structure of shape memory alloy.

Turning now to FIGS. 6-8, additional illustrative non-exclusive examples of tools 100 are schematically represented and indicated at 150. Tools 150 may include a structure of shape memory alloy 104 that includes a first body 152 and a second body 154 that are configured to cooperatively conform a sheet of composite material 102 to a desired contour when the structure of shape memory alloy is heated to within its activated temperature range and thus when the structure of shape memory alloy is deformed to its second conformation 108. In the schematic example illustrated, the first body and the second body of the structure of shape memory alloy are positioned on opposing sides of the sheet of composite material; however, such a configuration is not required to all embodiments of tools 150, and any suitable configuration of the first body and the second body may be used depending on the desired contour of the sheet of composite material.

Referring back to FIG. 2 with respect to optional tools 150, the positioning 52 of a method 50 therefore may include positioning the sheet of composite material between the first body and the second body, with the first body and the second body being positioned relative to each other to cooperatively conform the sheet of composite material to the desired contour during the heating 54.

Figure 9:
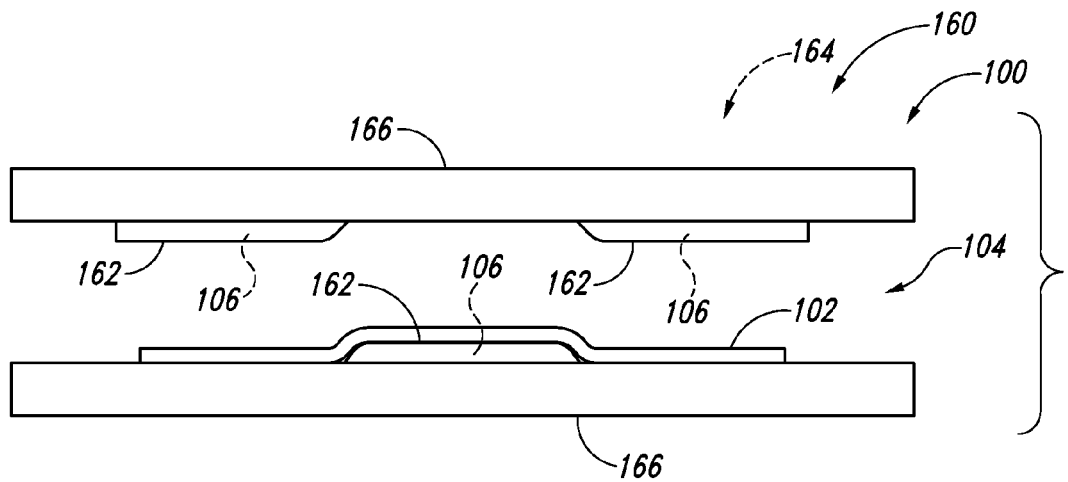
FIG. 9 is a schematic diagram representing additional illustrative, non-exclusive examples of tools for forming contoured composite structures, together with a flexible sheet of composite material to be formed into a contoured composite structure.
Figure 10:
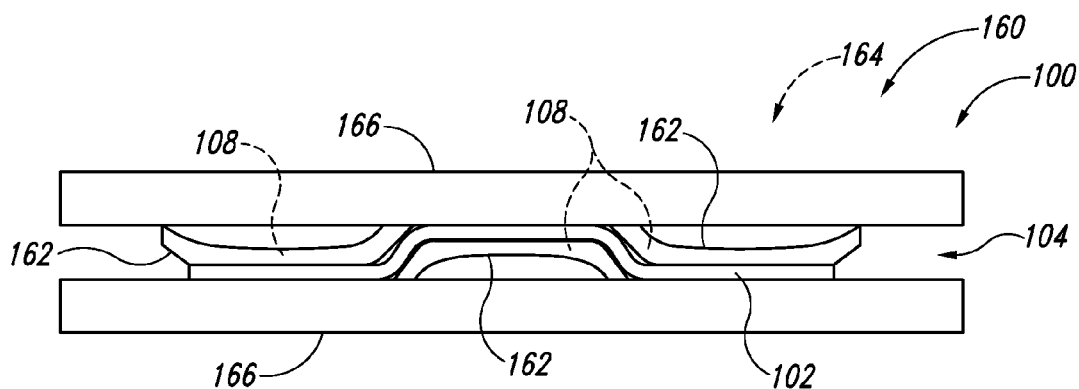
FIG. 10 is a schematic diagram representing the structure of shape memory alloy of the tool of FIG. 9 together with the sheet of composite material, with the structure of shape memory alloy having been heated from a non-deformed conformation to a deformed conformation and with the sheet of composite material conformed to the structure of shape memory alloy.
Figure 11:
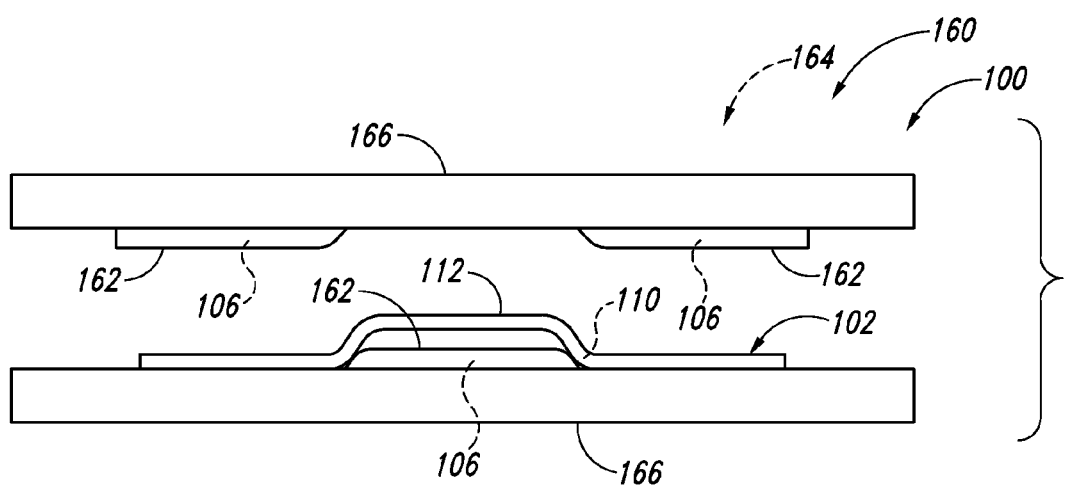
FIG. 11 is a schematic diagram representing the structure of shape memory alloy of the tool of FIG. 9 together with the sheet of composite material, with the structure of shape memory alloy having been cooled from the deformed conformation to the non-deformed conformation and with the sheet of composite material having been set into a desired contour by the structure of shape memory alloy.

Turning now to FIGS. 9-11, additional illustrative, non-exclusive examples of tools 100 are schematically represented and indicated generally at 160. Tools 160 may include a structure of shape memory alloy 104 that includes a plurality of bodies 162 that define a die configuration when the structure of shape memory alloy is deformed to its second conformation 108. Accordingly, a tool 160 may define a press 164 with support structures 166 that carry the structure of shape memory alloy for operative translation of the bodies 162 relative to each other to conform a sheet of composite material 102 to a desired contour 110 when the structure of shape memory alloy is heated to within its activated temperature range.

Accordingly, with respect to optional tools 160, a method 50 may include operatively translating the plurality of bodies 162, and collectively with the heating 54, conforming the sheet of composite material 102 to a desired contour and resulting in a conformed sheet of composite material 112. In some such methods 50, the operatively translating may be performed concurrently with the heating. In other methods 50, the operatively translating may be performed following the heating and prior to the cooling. In other methods 50, the operatively translating may be performed prior to the heating.

In some tools 100, a structure of shape memory alloy 104 may be operatively positioned within a substrate 170, such as a substrate that is not constructed of shape memory alloy.

Figure 12:
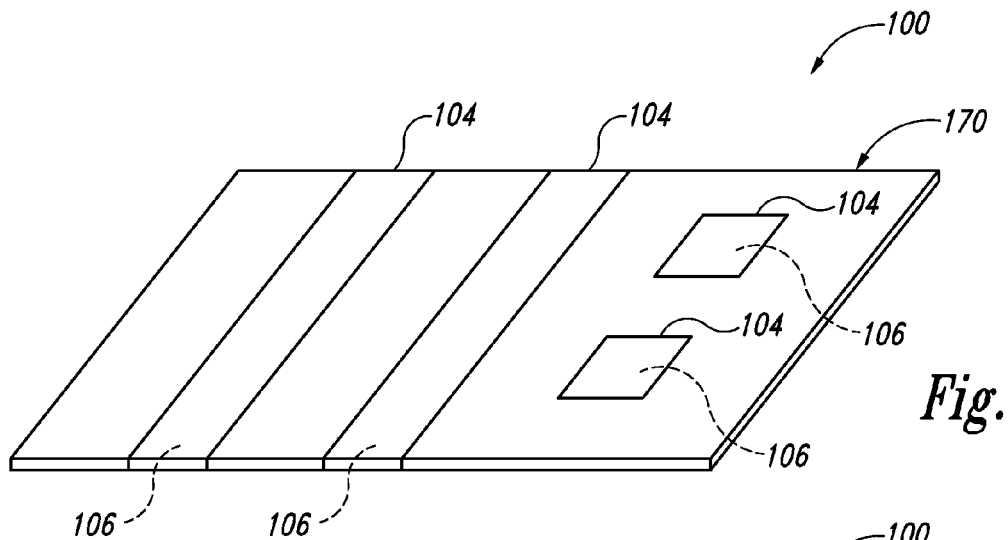
FIG. 12 is a schematic isometric view representing illustrative, non-exclusive examples of structures of shape memory alloy positioned within a substrate and in a non-deformed conformation.
Figure 13:
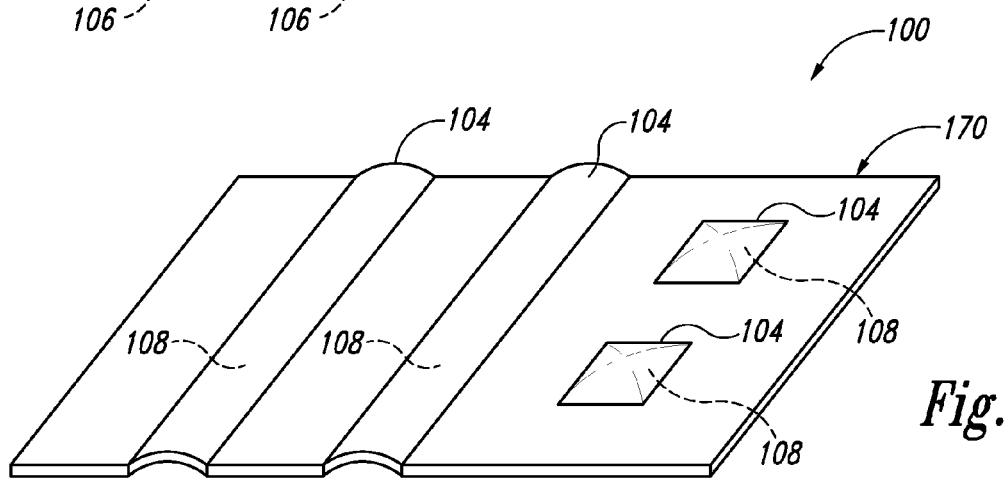
FIG. 13 is a schematic isometric view representing the examples of FIG. 12 with the structures of shape memory alloy having been heated from the non-deformed conformation to a deformed conformation.

In the illustrative, non-exclusive example of FIGS. 12-13, four distinct bodies of a structure of shape memory alloy 104 are schematically presented, with two bodies generally spanning a width of the substrate and two bodies being spaced-apart within the substrate. However, these optional configurations are provided for illustrative purposes only, and any desired and suitable configuration may be embodied in a tool 100. Operatively positioning a structure of shape memory alloy within a substrate may be useful depending on the desired contour of a contoured composite structure being formed. For example, various contours, including complex and even highly complex contours, may be imparted to a sheet of composite material based on the selective positioning, size, shape, and selection of shape memory alloy within a substrate 170. When heated to within the activated temperature range of the shape memory alloy, the shape memory alloy will deform to its deformed, second conformation 108, as illustrated in FIG. 13, while the substrate 170 does not deform.

Additionally or alternatively, a structure of shape memory alloy 104 may be coated, on one or more sides, with a material that is not constructed of shape memory alloy, such as a polymeric material. For example, a material may be selected for its surface characteristics, such as to ensure that the sheet of composite material appropriately adheres, does not adhere, slips, or does not slip relative to the structure of shape memory alloy, as may be desired, during the conforming 58. Additionally or alternatively, a structure of shape memory alloy 104 may be defined by a structure of fibers that are embedded in a polymer matrix and thereby defining a fiber reinforced composite material itself.

Figure 14:
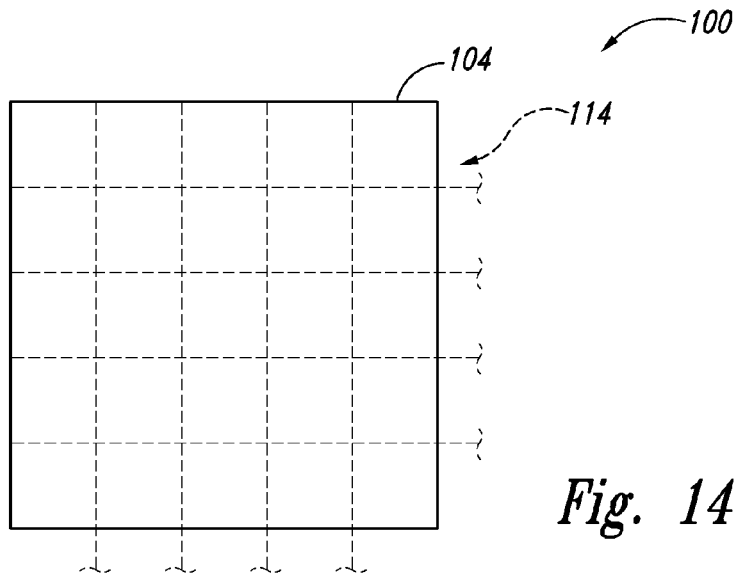
FIG. 14 is a schematic plan view of a structure of shape memory alloy with sub-regions configured to be selectively heated.

As mentioned, in some tools 100 and methods 50, a heat source 114 may be configured to selectively heat sub-regions of a structure of shape memory alloy 104 to within its activated temperature range. In some such tools and methods, the sub-regions may be selectively heated in a desired sequence. In some such tools and methods, fewer than all of the sub-regions may be selectively heated. Any suitable mechanism may be used to accomplish this functionality. FIG. 14 schematically illustrates a heat source 114 in connection with a structure of shape memory alloy, with the heat source defining a matrix, or grid, of possible heating locations on the structure of shape memory alloy. In some embodiments, a grid of resistive heating elements may be embedded, or at least partially embedded within the structure of shape memory alloy. Additional or alternatively, a heat plate or heat pad may be operatively positioned relative to the structure of shape memory alloy, with the heat plate or heat pad being configured to selectively heat the structure of shape memory alloy according to a predetermined pattern and/or sequence. Other configurations also are within the scope of the present disclosure.

Figure 15:
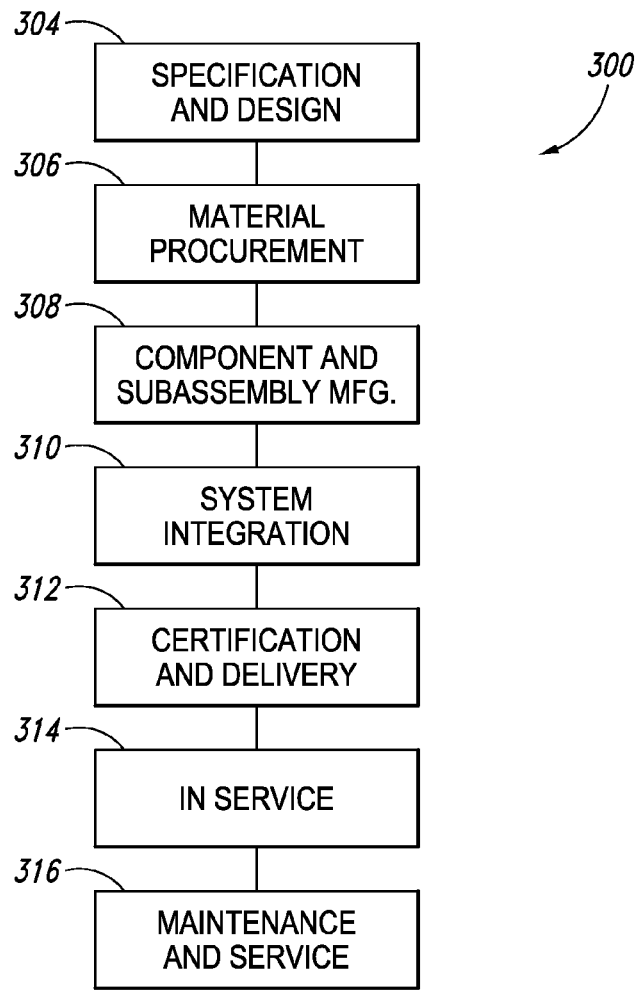
FIG. 15 is a flowchart representing aircraft production and service methodology.
Figure 16:
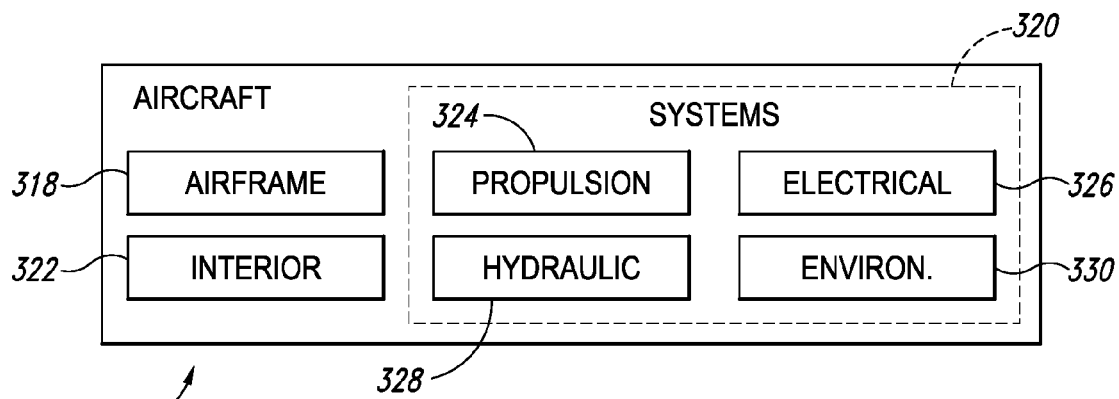
FIG. 16 is a schematic block diagram representing an aircraft.

Turning now to FIGS. 15-16, embodiments of the present disclosure may be described in the context of an aircraft manufacturing and service method 300 as shown in FIG. 15 and an aircraft 10 as shown in FIG. 16. During pre-production, exemplary method 300 may include specification and design 304 of the aircraft 10 and material procurement 306. During production, component and subassembly manufacturing 308 and system integration 310 of the aircraft 10 takes place. Thereafter, the aircraft 10 may go through certification and delivery 312 in order to be placed in service 314. While in service by a customer, the aircraft 10 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 10 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 10 is in service. Also, one or more apparatus embodiments, method embodiments, or a combination thereof may be utilized during the production stages 308 and 310, for example, by substantially expediting assembly of or reducing the cost of an aircraft 10. Similarly, one or more of apparatus embodiments, method embodiments, or a combination thereof may be utilized while the aircraft 10 is in service, for example and without limitation, during maintenance and service 316.

Illustrative, non-exclusive examples of inventive subject matter according to the present disclosure are described in the following enumerated paragraphs:

A. A method of forming a contoured composite structure, the method comprising:

positioning a sheet of composite material in operative relation to a structure of shape memory alloy, wherein the structure of shape memory alloy is configured to deform between a first conformation and a second conformation when heated to within an activated temperature range;

following the positioning, heating the structure of shape memory alloy to within the activated temperature range, thereby deforming the structure of shape memory alloy from the first conformation to the second conformation, and thereby conforming the sheet of composite material to a desired contour at least partially corresponding to the second conformation and resulting in a conformed sheet of composite material; and following the heating, cooling the structure of shape memory alloy to below the activated temperature range, thereby deforming the structure of shape memory alloy from the second conformation to the first conformation, while maintaining the sheet of composite material in the desired contour.

A1. The method of paragraph A, wherein the structure of shape memory alloy includes a first body and a second body;

wherein the positioning includes positioning the sheet of composite material between the first body and the second body; and wherein the first body and the second body are positioned relative to each other to cooperatively conform the sheet of composite material to the desired contour during the heating.

A1.1. The method of paragraph A1, wherein the heating is performed outside of an autoclave or oven.

A2. The method of any of paragraphs A-A1.1, wherein the structure of shape memory alloy includes a plurality of bodies, wherein the plurality of bodies defines a die configuration when the structure of shape memory alloy is deformed to the second conformation.

A2.1. The method of paragraph A2, further comprising:
operatively translating the plurality of bodies, and collectively with the heating, conforming the sheet of sheet of composite material to the desired contour and resulting in the conformed sheet of composite material.

A2.1.1. The method of paragraph A2.1, wherein the operatively translating is performed concurrently with the heating.

A2.1.2. The method of paragraph A2.1, wherein the operatively translating is performed following the heating and prior to the cooling.

A2.1.3. The method of paragraph A2.1, wherein the operatively translating is performed prior to the heating.

A3. The method of any of paragraphs A-A2.1.3, wherein the structure of shape memory alloy is operatively positioned within a substrate, optionally wherein the substrate is not constructed of shape memory alloy.

A4. The method of any of paragraphs A-A3, wherein the heating at least partially sets the conformed sheet of composite material in the desired contour.

A5. The method of any of paragraphs A-A4, wherein the heating includes heating the structure of shape memory alloy with one or more heating plates in operative engagement with the structure of shape memory alloy.

A6. The method of any of paragraphs A-A5, wherein the structure of shape memory alloy includes one or more integral resistive heating elements, and wherein the heating is performed by the one or more integral resistive heating elements.

A7. The method of any of paragraphs A-A6, further comprising:
positioning the sheet of composite material and the structure of shape memory alloy in an autoclave or an oven, wherein the heating is performed by the autoclave or the oven.

A8. The method of any of paragraphs A-A7, wherein the structure of shape memory alloy includes a plurality of sub-regions, and wherein the heating includes operatively heating fewer than all of the plurality of sub-regions.

A9. The method of any of paragraphs A-A8, wherein the structure of shape memory alloy includes a plurality of sub-regions, and wherein the heating results in a first subset of the plurality of sub-regions being heated to within the activated temperature range and a second subset of the plurality of sub-regions not being heated to within the activated temperature range.

A10. The method of any of paragraphs A-A9, wherein the heating includes sequentially heating sub-regions of the structure of shape memory alloy in a predetermined sequence.

A11. The method of any of paragraphs A-A10, wherein the heating includes curing the conformed sheet of composite material, thereby resulting in a cured composite structure.

A12. The method of any of paragraphs A-A11, further comprising:
following the cooling, curing the conformed sheet of composite material, thereby resulting in a cured composite structure.

A12.1. The method of paragraph A12, wherein the curing is performed within an autoclave or oven configured to heat the conformed sheet of composite material to within a cure temperature range, wherein the composite material is configured to cure within the cure temperature range.

A12.1.1. The method of paragraph A12.1, wherein the structure of shape memory alloy is not within the autoclave or oven during the curing.

A12.1.1.1. The method of paragraph A12.1.1, further comprising:
following the cooling and prior to the curing, separating the conformed sheet of composite material from the structure of shape memory alloy.

A12.1.2 The method of paragraph A12.1, further comprising:
locating the structure of shape memory alloy within the autoclave or oven with the conformed sheet of composite material during the curing.

A13. The method of any of paragraphs A-A12.1.2, further comprising:
following the positioning and prior to the heating, retaining the sheet of composite material relative to the structure of shape memory alloy.

A13.1. The method of paragraph A13, wherein the retaining includes vacuum bagging the sheet of composite material to the structure of shape memory alloy.

A13.2. The method of any of paragraphs A13-A13.1, wherein the retaining includes applying a vacuum between the sheet of composite material and the structure of shape memory alloy.

A14. The method of any of paragraphs A-A13.2, further comprising:
concurrently with the heating, impeding the deforming so that the second conformation corresponds to the desired contour.

A15. The method of any of paragraphs A-A14, wherein the second conformation defines a complex contour.

A16. The method of any of paragraphs A-A15, wherein the first conformation is generally planar, and optionally planar.

A17. The method of any of paragraphs A-A16, wherein the conformed sheet of composite material defines a complex contour.

A18. The method of any of paragraphs A-A17, wherein the sheet of composite material includes one or more prepeg composite plies.

A19. The method of any of paragraphs A-A18, wherein the composite structure is an aerospace structure.

A20. An aerospace structure including a contoured composite structure formed according to the method of any of paragraphs A-A19.

B. A tool for forming a contoured composite structure, the tool comprising:
a structure of shape memory alloy configured to deform from a first conformation to a second conformation when heated to within an activated temperature range, wherein the second conformation corresponds to a desired contour of a sheet of composite material, and wherein the structure of shape memory alloy is configured to operatively receive the sheet of composite material; and
a heat source configured to heat the structure of shape memory alloy to within the activated temperature range to deform the structure of shape memory alloy from the first conformation to the second conformation and thus to conform the sheet of composite material to a desired contour at least partially corresponding to the second conformation of the shape memory alloy.

B1. The tool of paragraph B, in combination with the sheet of composite material in operative relation to the structure of shape memory alloy.

B2. The tool of any of paragraphs B-B1, wherein the structure of shape memory alloy includes a first body and a second body positioned relative to the first body, wherein the first body and the second body are configured to cooperatively conform the sheet of composite material to a desired contour when the structure of shape memory alloy is heated to within the activated temperature range and thus when the structure of shape memory alloy is deformed to the second conformation.

B3. The tool of any of paragraphs B-B2, wherein the structure of shape memory alloy includes a plurality of bodies, wherein the plurality of bodies defines a die configuration when the structure of shape memory alloy is deformed to the second conformation.

B3.1. The tool of paragraph B3, wherein the bodies of the plurality of bodies are configured to be translated relative to each other to conform the sheet of composite material to the desired contour when the structure of shape memory alloy is heated to within the activated temperature range.

B4. The tool of any of paragraphs B-B3.1, further comprising:
a substrate, wherein the structure of shape memory alloy is operatively positioned within the substrate, optionally wherein the substrate is not constructed of shape memory alloy.

B5. The tool of any of paragraphs B-B4, wherein the heat source includes one or more heating plates in operative engagement with the structure of shape memory alloy.

B6. The tool of any of paragraphs B-B5, wherein the heat source includes one or more resistive heating elements that are integral with, or at least partially embedded within, the structure of shape memory alloy.

B7. The tool of any of paragraphs B-B6, wherein the heat source includes an autoclave or an oven.

B8. The tool of any of paragraphs B-B7, wherein the structure of shape memory alloy includes a plurality of sub-regions, and wherein the heat source is configured to operatively heat fewer than all of the plurality of sub-regions.

B9. The tool of any of paragraphs B-B8, wherein the structure of shape memory alloy includes a plurality of sub-regions, and wherein the heat source is configured to heat a first subset of the plurality of sub-regions to within the activated temperature range and to not heat a second subset of the plurality of sub-regions to within the activated temperature range.

B10. The tool of any of paragraphs B-B9, wherein the heat source is configured to sequentially heat predetermined sub-regions of the structure of shape memory alloy in a predetermined sequence.

B11. The tool of any of paragraphs B-B10, further comprising:
a controller configured to operatively control the heat source to sequentially heat predetermined sub-regions of the structure of shape memory alloy in a predetermined sequence.

B12. The tool of any of paragraphs B-B11, further comprising:
a retention structure configured to selectively retain the sheet of composite material relative to the structure of shape memory alloy when the heat source heats the structure of shape memory alloy to within the activated temperature range.

B12.1. The tool of paragraph B12, wherein the retention structure includes a vacuum bagging assembly.

B13. The tool of any of paragraphs B-B12.1, further comprising:
a mechanical impeder operatively coupled to the structure of shape memory alloy, wherein the mechanical impeder is configured to operatively resist deformation of the structure of shape memory alloy from the first conformation to the second conformation.

B14. The tool of any of paragraphs B-B13, wherein the second conformation defines a complex contour.

B15. The tool of any of paragraphs B-B14, wherein the first conformation is generally planar, and optionally planar.

B16. The tool of any of paragraphs B-B15, wherein the sheet of composite material includes one or more pre-peg composite plies.

B17. The tool of any of paragraphs B-B16, wherein the contoured composite structure is an aerospace structure.

B18. The tool of any of paragraphs B-B17 configured to perform the method of any of paragraphs A-A19.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of forming a contoured composite structure, the method comprising:
   positioning a sheet of composite material in operative relation to a structure of shape memory alloy, wherein the structure of shape memory alloy is configured to deform between a first conformation and a second conformation when heated to within an activated temperature range;
   following the positioning, heating the structure of shape memory alloy to within the activated temperature range, thereby resulting in deforming the structure of shape memory alloy from the first conformation to the second conformation, and thereby resulting in conforming the sheet of composite material to a desired contour at least partially corresponding to the second conformation and resulting in a conformed sheet of composite material; and
   following the heating, cooling the structure of shape memory alloy to below the activated temperature range, thereby deforming the structure of shape memory alloy from the second conformation to the first conformation, while maintaining the sheet of composite material in the desired contour.

2. The method of claim 1,
   wherein the structure of shape memory alloy includes a first body and a second body;
   wherein the positioning includes positioning the sheet of composite material between the first body and the second body; and
   wherein the first body and the second body are positioned relative to each other to cooperatively conform the sheet of composite material to the desired contour during the heating.

3. The method of claim 1, wherein the structure of shape memory alloy includes a plurality of bodies, wherein the plurality of bodies defines a die configuration when the structure of shape memory alloy is deformed to the second conformation, the method further comprising:
   operatively translating the plurality of bodies, and collectively with the heating, conforming the sheet of composite material to the desired contour and resulting in the conformed sheet of composite material.

4. The method of claim 1, wherein the structure of shape memory alloy is operatively positioned within a substrate, wherein the substrate is not constructed of shape memory alloy.

5. The method of claim 1, wherein the heating at least partially sets the conformed sheet of composite material in the desired contour.

6. The method of claim 1, wherein the heating includes heating the structure of shape memory alloy with one or more heating plates in operative engagement with the structure of shape memory alloy.

7. The method of claim 1, wherein the structure of shape memory alloy includes one or more integral resistive heating elements, and wherein the heating is performed by the one or more integral resistive heating elements.

8. The method of claim 1, further comprising:
   positioning the sheet of composite material and the structure of shape memory alloy in an autoclave or an oven, wherein the heating is performed by the autoclave or the oven.

9. The method of claim 1, wherein the structure of shape memory alloy includes a plurality of sub-regions, and wherein the heating includes operatively heating fewer than all of the plurality of sub-regions.

10. The method of claim 1, wherein the heating includes sequentially heating sub-regions of the structure of shape memory alloy in a predetermined sequence.

11. The method of claim 1, wherein the heating includes curing the conformed sheet of composite material, thereby resulting in a cured composite structure.

12. The method of claim 1, further comprising:
   following the cooling, curing the conformed sheet of composite material, thereby resulting in a cured composite structure.

13. The method of claim 1, further comprising:
   following the positioning and prior to the heating, retaining the sheet of composite material relative to the structure of shape memory alloy.

14. The method of claim 13, wherein the retaining includes vacuum bagging the sheet of composite material to the structure of shape memory alloy.

15. The method of claim 1, further comprising:
   concurrently with the heating, impeding the deforming so that the second conformation corresponds to the desired contour.

16. The method of claim 1, wherein the second conformation defines a complex contour.

17. The method of claim 1, wherein the first conformation is generally planar.

18. The method of claim 1, wherein the conformed sheet of composite material defines a complex contour.

19. A method of forming a contoured composite structure, the method comprising:
   positioning a sheet of composite material in operative relation to a structure of shape memory alloy, wherein the structure of shape memory alloy is configured to deform between a first conformation and a second conformation when heated to within an activated temperature range;
   following the positioning, retaining the sheet of composite material relative to the structure of shape memory alloy, wherein the retaining includes vacuum bagging the sheet of composite material to the structure of shape memory alloy;
   following the positioning, heating the structure of shape memory alloy to within the activated temperature range, thereby resulting in deforming the structure of shape memory alloy from the first conformation to the second conformation, and thereby resulting in conforming the sheet of composite material to a desired contour at least partially corresponding to the second conformation and resulting in a conformed sheet of composite material, wherein the heating at least partially sets the conformed sheet of composite material in the desired contour, and wherein the desired contour has a complex contour;
   following the heating, cooling the structure of shape memory alloy to below the activated temperature range, thereby deforming the structure of shape memory alloy from the second conformation to the first conformation, while maintaining the sheet of composite material in the desired contour; and
   following the cooling, curing the conformed sheet of composite material, thereby resulting in a cured composite structure.

* * * * *